Patented Mar. 11, 1952

2,588,517

UNITED STATES PATENT OFFICE 2,588,517

BIPHENYL AMINE SALTS OF PENICILLIN

Alphonse P. Granatek, Syracuse, N. Y., assignor to Bristol Laboratories Inc., Syracuse, N. Y., a corporation of New York No Drawing. Application March 8, 1951,
Serial No. 214,639

2 Claims. (Cl. 260—239.1)

This invention relates to a new amine salt of penicillin. More particularly this invention relates to para-amino biphenyl penicillin which is capable of exerting a repository antibiotic action, and is also useful for oral administration and for external application. It is also suitable for addition to various animal feeds.

The new penicillin salt of the present invention has the following formula:

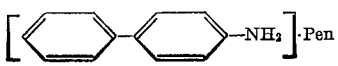

wherein Pen designates an acid penicillin radical or an active moiety thereof, capable of forming an addition salt with p-amino biphenyl.

A more comprehensive understanding of this invention is obtained by reference to the following examples.

Example I

To 0.186 g. of p-amino biphenyl was added 1.0 cc. of 1N HCl in 5 cc. of water with stirring. The mixture was heated but solution of the amine remained incomplete. To this solution was added 0.396 g. of sodium penicillin G in 12.0 cc. of water (52,750 u./cc.). An immediate turbidity resulted and the precipitate which was formed changed color, sank to the bottom and eventually floated. The mixture was scratched and placed in the refrigerator for several days. The white crystalline precipitate which was formed was filtered off and dried in a vacuum desiccator.

Assay _____ u./mg__ 563
Solubility _____ u./cc__ 1,011

Example II

To 5.58 g. of p-amino biphenyl was added with stirring 30 cc. of 1N HCl in 150 cc. of water. The mixture was heated but all the amine did not go into solution. To the amine solution was added 11.88 g. of sodium penicillin G in 360 cc. of water (54,250 u./cc.). The pH was adjusted to 5.5 with NaOH. An immediate turbidity resulted and then a gum was formed. Some crystals formed with scratching. The solution was refrigerated for several days. The light yellow crystalline precipitate was filtered off, washed and dried.

Yield _____ g__ 14.065
Iodometric assay _____ u./mg__ 417
Biological assay _____ u./mg__ 271

Example III 23.76 g. of sodium penicillin G were dissolved in water and placed in a separatory funnel. 90 cc. of ethyl ether were added to the separatory funnel as well as phosphoric acid until pH=2. The acid penicillin was extracted in the ether layer and the ether extract dried with anhydrous sodium sulfate. 11.16 g. of p-amino biphenyl were dissolved in 30 cc. of ether and the ether extract dried with anhydrous sodium sulfate. The dried ether extracts were then combined. When the ether solutions were mixed an immediate turbidity resulted. On scratching the flask became filled with white crystals. The solution was refrigerated for 5 hours and the white crystals filtered off.

Yield _____ g__ 23.4
Iodometric assay _____ u./mg__ 836
Biological assay _____ u./mg__ 925
Solubility:
    Iodometric assay _____ u./cc__ 288
    Biological assay _____ u./cc__ 100

The filtrate was allowed to stand in the cold for several days and an additional 3.0 g. of crystals formed. This second precipitate evidently contained some impurities.

Iodometric assay _____ u./mg__ 192
Biological assay _____ u./mg__ 200
Solubility:
    Iodometric assay _____ u./cc__ 33
    Biological assay _____ u./cc__ 60
Theoretical yield _____ g__ 33.4
Per cent yield _____ 70
Theoretical potency _____ u./mg__ 1179

While the present invention has been described with particular reference to the p-amino biphenyl salt of penicillin G it will be understood that p-amino biphenyl salts of other penicillins are also included within the scope of this invention. For instance, the natural penicillins such as penicillin G, F, X, dihydro F and K and mixtures of two or more such penicillins, particularly such mixtures containing at least 85% penicillin G, are included within the scope of the present invention.

Also, other salts of p-amino biphenyl other than the hydrochloride may be employed. Examples of such salts are the phosphate, nitrate, hydrobromide, sulfate, citrate, tartrate, etc.

The reaction can be carried out in solvents other than water and ether. Examples of such solvents are butanol, propanol, amyl acetate, methyl amyl acetate, isopropyl ether, mesityl oxide and methyl isobutyl ketone.

I claim:
1. Para-amino biphenyl penicillin.
2. Para-amino biphenyl penicillin G.

ALPHONSE P. GRANATEK.

REFERENCES CITED

The following references are of record in the file of this patent:

British Report C. M. R., Br. 234 (P. B. 79,927), December 5, 1947, p. 3.